United States Patent
Rudolph et al.

(10) Patent No.: US 9,217,464 B2
(45) Date of Patent: Dec. 22, 2015

(54) RADIAL BEARING

(71) Applicant: Voith Patent GmbH, Heidenheim (DE)

(72) Inventors: Ralph Rudolph, Kranzegg (DE);
Andreas Fuchs, Pfronten-Ried (DE);
Klaus-Peter Sprol, Kempten (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/374,303

(22) PCT Filed: Jan. 29, 2013

(86) PCT No.: PCT/EP2013/051607
§ 371 (c)(1),
(2) Date: Jul. 24, 2014

(87) PCT Pub. No.: WO2013/120687
PCT Pub. Date: Aug. 22, 2013

(65) Prior Publication Data
US 2015/0049969 A1 Feb. 19, 2015

(30) Foreign Application Priority Data
Feb. 14, 2012 (DE) .......................... 10 2012 002 713

(51) Int. Cl.
*F16C 17/03* (2006.01)
*F16C 23/04* (2006.01)

(52) U.S. Cl.
CPC ................. *F16C 17/03* (2013.01); *F16C 23/04* (2013.01); *F16C 2360/23* (2013.01)

(58) Field of Classification Search
CPC ...... F16C 17/03; F16C 23/04; F16C 2360/23; F16C 23/043; F16C 25/02; F16C 25/04; F16C 33/26; F16C 33/1075; F16C 33/108
See application file for complete search history.

(56) References Cited

U.S. PATENT DOCUMENTS 2,063,570 A    12/1936   Wallgren
(Continued)

FOREIGN PATENT DOCUMENTS

CH    558 481    1/1975
(Continued)

OTHER PUBLICATIONS

English Translation of PCT International Preliminary Report on Patentability dated May 7, 2014 in PCT Application No. PCT/EP2013/051607.

*Primary Examiner* — Alan B Waits
(74) *Attorney, Agent, or Firm* — Farjami & Farjami LLP (57) ABSTRACT

The invention relates to a radial bearing, comprising a housing, a housing bore extending along a bearing axis, several tilting segments that are arranged around the bearing axis in order to support a shaft and each have a radially outer bearing surface, by means of which the tilting segments are supported on a supporting surface on the housing. The radially outer bearing surface of each tilting segment and the supporting surface are arranged facing each other. Each tilting segment is movably arranged relative to the housing. The invention is characterized by the following features: a first one of the surfaces forms a first section curve with a first section plane perpendicular to the bearing axis; the first section curve is convexly curved and has a first main radius of curvature, and the second surface forms a second section curve with the section plane perpendicular to the bearing axis; the second section curve is correspondingly concavely curved and has a second main radius of curvature, wherein the magnitude of the first main radius of curvature of the first surface is smaller than the magnitude of the second main radius of curvature of the second surface; the first surface forms a third section curve with a second section plane parallel to the bearing axis; the third section curve is convexly curved and has a first secondary radius of curvature, and the second surface forms a fourth section curve with the second section plane parallel to the bearing axis; and the fourth section curve is correspondingly concavely curved or not curved and has a second secondary radius of curvature or correspondingly has no curvature, the two secondary radii of curvature being different from each other.

15 Claims, 6 Drawing Sheets

(56) References Cited

U.S. PATENT DOCUMENTS

| | | | |
|---|---|---|---|
| 3,421,799 A * | 1/1969 | Sibley et al. | 384/115 |
| 3,944,304 A * | 3/1976 | Purtschert | 384/117 |
| 4,247,157 A | 1/1981 | Sigg | |
| 4,457,634 A * | 7/1984 | Vinciguerra | 384/302 |
| 4,668,108 A * | 5/1987 | McHugh | 384/215 |
| 5,738,447 A | 4/1998 | Nicholas | |
| 5,795,076 A * | 8/1998 | Ball et al. | 384/307 |
| 6,485,182 B2 | 11/2002 | Nicholas | |
| 6,767,133 B2 * | 7/2004 | New | 384/312 |
| 8,197,144 B2 * | 6/2012 | Shepherd | 384/309 |
| 8,292,507 B2 * | 10/2012 | Hirai et al. | 384/117 |
| 2011/0019950 A1 | 1/2011 | Hirai | |
| 2013/0028731 A1 * | 1/2013 | Mimura et al. | 415/229 |

FOREIGN PATENT DOCUMENTS

| | | |
|---|---|---|
| DE | 957 087 | 1/1957 |
| DE | 195 14 830 | 10/1995 |
| DE | 695 03 138 | 3/1999 |
| DE | 601 10 751 | 2/2006 |
| DE | 60 2004 003 239 | 6/2007 |
| EP | 1 369 605 | 12/2003 |
| EP | 1 859 175 | 5/2009 |
| EP | 2 339 192 | 6/2011 |
| GB | 1592033 A * | 7/1981 |
| GB | 2 285 491 | 7/1995 |
| JP | S 58-102819 | 6/1983 |
| JP | S 58-180815 | 10/1983 |
| JP | 2009-257349 | 11/2009 |

* cited by examiner

RADIAL BEARING

This is a U.S. national phase application, which is based on, and claims priority from, PCT application Ser. No. PCT/EP2013/051607, filed Jan. 29, 2013, which claims priority from foreign application Ser. No. 10 2012 002 713.3, filed Feb. 14, 2012, in Germany.

The invention relates to a radial bearing according to the preamble of Claim 1. It therefore relates to a bearing which has a plurality of tilting pads, which mount a shaft. It is referred to as a tilting pad bearing and is included among the hydrodynamic plain bearings.

Reference is hereby made to the following patents:
U.S. Pat. No. 5,738,447 A
U.S. Pat. No. 6,485,182 B
DE 60110751 T2
DE 69503138 T2
EP 2 339 192 A1
DE 19514830 C2
GB 2285491 A
DE 602004003239 T2
EP 1859175 B1
CH 558481 A.

The rotor-dynamic properties of turbo-transmissions are essentially determined by the properties of the mounting and by the geometry of the shafts. In the case of very high shaft speeds, above all radial tilting pad bearings are used here. Development in turbo-transmission construction has resulted in greater power transmission, greater power density, and higher speeds with simultaneous demand for higher efficiency and more stable oscillation behavior. To meet these growing demands, a radial tilting pad bearing is necessary, which can be operated in the turbo-transmission system at higher speed and with higher bearing compression, with less bearing play change in transient operation, slight bearing deformations, and with improved oscillation properties.

The mentioned properties of the bearing are dependent on one another. For example, the possibility results by way of higher bearing compression of embodying the bearing as smaller and increasing the efficiency of the bearing.

During the startup of a turbo-transmission, strong thermal expansions with little bearing cooling can occur locally as a result of the transient operation, which result in impermissibly small bearing play in the tilting pad bearing.

The mentioned radial tilting pad bearings come into consideration in particular for supercritically rotating shafts, the oscillation behaviors of which are decisively influenced by the stiffness and damping properties of the bearings.

The invention is based on the object of embodying a radial bearing according to the preamble of claim 1 such that the present limits for the use of a radial tilting pad bearing with respect to bearing compression, efficiency, and oscillation behavior can be exceeded.

This object is achieved by means of a radial bearing according to claim 1.

A radial bearing according to the invention comprises a housing, a housing borehole extending along a bearing axis, multiple tilting pads, which are arranged about the bearing axis for mounting a shaft and each have a radial outer bearing surface, using which the tilting pads are supported on a support surface on the housing, wherein the radial outer bearing surface of each tilting pad and the support surface are arranged opposite to one another. Each tilting pad is arranged so it is movable in relation to the housing.

According to the invention, a first of the surfaces forms a first section curve with a first section plane perpendicular to the bearing axis. The first section curve is convexly curved and has a first main radius of curvature, and the second surface forms a second section curve with the section plane perpendicular to the bearing axis. The second section curve is accordingly concavely curved and has a second main radius of curvature, wherein the absolute value of the first main radius of curvature of the first surface is less than the absolute value of the second main radius of curvature of the second surface. The first surface forms a third section curve with a second section plane parallel to the bearing axis. The third section curve is convexly curved and has a first secondary radius of curvature. The second surface forms a fourth section curve with the second section plane parallel to the bearing axis. The fourth section curve is accordingly concavely curved or is not curved and has a second secondary radius of curvature or accordingly has no curvature, wherein the two secondary radii of curvature differ from one another.

Therefore, for the two section curves of the secondary curvature, curvature combinations of convex to concave or convex to level or concave to convex or level to convex can be provided.

The relationship of the two secondary radii of curvature in the contact point of the support surface with the radial outer bearing surface can be embodied in dependence on the curvature combinations such that only one contact point always exists between the radial outer bearing surface and the support surface.

The essential idea of the invention is to embody the radial outer bearing surface of the individual tilting pad and the support surface of the pressure block such that they essentially form a spot mount with one another, but in this case at least the bearing stiffness of a linear contact of conventional radial tilting pad bearings is maintained and the tilting pads remain in the desired position in the circumferential direction solely due to the hydrodynamic force action of the lubricating film pressure between the shaft and the tilting pad and the contact between tilting pad and pressure block, which is fastened fixedly on the housing.

It is decisive for this equilibrium state that the second main radius of curvature in the contact point of the support surface with the radial outer bearing surface in a section plane perpendicular to the bearing axis is less than the distance between the bearing axis and the contact point.

The respective tilting pad in the non-tilted position is to be tiltable in at least two directions, namely, on the one hand, about a first tilt axis, which is parallel to the longitudinal axis of the radial bearing, referred to as the bearing axis hereafter, and, on the other hand, about a second tilt axis, which extends at an angle or perpendicular to the first tilt axis and therefore at an angle or perpendicular to the bearing axis.

The two tilt axes do not necessarily have to be stationary in relation to the bearing axis in this case, but rather can also move, as a result of a relative rotational or rolling movement between the respective bearing surface and the support surface, in relation to the bearing axis, in particular with the respective tilting pad. This tilting ability enables the compensation movement of the shaft in the radial bearing and is achieved by means of the main and/or secondary curvature according to the invention. The latter can extend in this case over the entire pad (tilting pad, pressure block), in a manner of speaking from edge to edge, or only partially over the element. In this way, the individual tilting pad has unrestricted tilting freedom in a certain way and no local overloads or wear at the edges occur.

Since in each case main radius of curvature and secondary radius of curvature of two opposing surfaces differ from one another, an increasing distance thereof to one another results starting from a theoretical contact point of the two surfaces.

In this case, the main radii of curvature and the secondary radii of curvature of the same surface may preferably also differ from one another. This means that, for example, the respective tilting pad has a different radius in the main curvature than in the secondary curvature. This applies similarly in the case of varying radii of the main and secondary curvatures of the mentioned surfaces, as will be explained hereafter.

The radial outer bearing surface of each tilting pad is preferably supported directly, i.e., without further elements interposed, by the support surface. The concept directly includes that in operation of the plain bearing, the surfaces facing toward one another, namely the radial outer bearing surface and the support surface, can be separated from one another by a lubricant film and therefore do not contact one another directly. When rolling of one surface on the other surface is mentioned hereafter, this always means that such a lubricant film is located between them. A tilting pad preferably has precisely one surface, which is coherent in particular, namely the radial outer bearing surface, by means of which it is also supported by precisely one counter surface, namely the support surface. The section planes are to be located, in each case so that the curve which results from the section of the section plane with the respective surface lies centrally in relation to the edges of the surface. However, this does not necessarily have to be the case. Thus, the section planes can be placed such that asymmetrical curvatures are also implementable with respect to the edges of the surfaces.

Furthermore, the main and/or secondary radius of curvature of at least one of the mentioned surfaces can vary.

A supplementary idea according to the invention is to provide a lubricant and cooling system for cooling the tilting pads, so that the resulting bearing temperature in operation is less than in the case of conventional radial tilting pad bearings. The cooling system has the features of applying the fresh (relatively cool) cooling medium as directly as possible and directed onto the radial inner bearing surface of the tilting pad and to conduct the cooling medium heated by the bearing out of the bearing again as directly as possible after the heating.

The cooling of the tilting pads can preferably be performed in that an oil supply strip for supplying coolant or lubricant to a gap formed by the respective tilting pads and the shaft is provided between two tilting pads. In this case, the oil supply strip opens into the region of the gap, wherein its discharge surface is oriented toward an edge of the tilting pad, in particular the intake edge passed over first by the shaft when viewed in the rotational direction of the shaft.

In this case, a plurality of oil supply strips can be provided, which are distributed over the circumference of the radial bearing, so that such an oil supply strip is arranged between each two adjacent tilting pads.

Furthermore, the at least one oil supply strip can be inclined in relation to the radial of the axis of rotation of the shaft or the bearing axis, respectively.

Preferably, recesses for supplying oil exiting from the oil supply strip to the gap formed by the shaft and the tilting pad can be provided in the region of the intake edge in at least one tilting pad. The oil supply strip comprises oil ducts in this case. The discharge openings of the oil supply strip or the oil ducts can thus partially or completely overlap with the recesses in the direction of the longitudinal axis of the discharge openings. The longitudinal axes of the recesses of the tilting pads therefore extend coaxially or in parallel to the longitudinal axis of the oil supply strip. The surfaces of the recesses and the discharge openings could also be embodied as congruent. The recesses can be embodied in particular as symmetrical grooves. The longitudinal axes or axes of symmetry of the recesses can also be coincident with the radial or can extend parallel thereto. This can also be the case additionally or alternatively for the oil ducts of the oil supply strip.

According to a further embodiment, the radial bearing comprises a first oil barrier for tapping relatively hot entrained oil from a gap formed by the respective tilting pad and the shaft, wherein the first oil barrier is arranged between two tilting pads and protrudes with its free end radially from the outside into the region of the gap. The first oil barrier therefore taps a large part of the hot oil exiting from the gap.

The radial bearing can also comprise a further oil barrier for supplying relatively cold fresh oil to a gap formed by the respective tilting pad and the shaft, wherein the further oil barrier is arranged between two tilting pads and protrudes with its free end radially from the outside into an intermediate space between housing and tilting pad.

The free, radial inner end of at least one of the oil barriers can preferably be located on or radially outside the radial inner bearing surface of the tilting pad, on which it adjoins directly. In this case, in particular the free end of the one oil barrier can be arranged spaced apart in the circumferential direction of the shaft from the free end of the further oil barrier and in particular can be arranged before of the free end of the further oil barrier when viewed in the rotational direction of the shaft.

According to a further embodiment, in this case the one oil barrier and the further oil barrier are arranged axially spaced apart from one another on the same oil supply strip in each case.

Preferably, the radial inner end of at least one of the oil barriers can be located on or radially outside the radial inner bearing surface, wherein preferably the oil barriers are fastened on the oil supply strip, in particular fastened in a form-fitted, friction-locked, or integrally joined manner on its radial inner end, or are embodied integrally with the oil supply strip or the housing.

Further features result from the following description. The following is described therein in detail.

The radial bearing comprises a housing 1 having a borehole. It could also be said that the housing 1 consists of a cylindrical sleeve. In the present case, it is constructed from two half shells. See FIGS. 1 and 2. There could also be multiple partial shells.

The entirely essential elements are recognizable from FIGS. 4 and 7 to 9. The tilting pads 2 are to be mentioned first here. The latter are arranged grouped around the bearing axis 11a. In the present case, there are four tilting pads. However, there could also be more or fewer.

Figure 7:
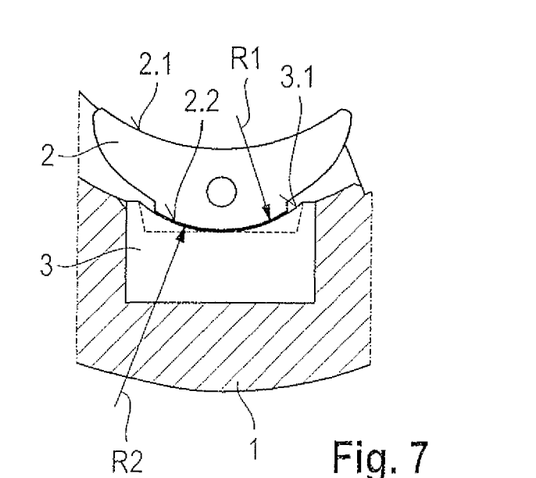
FIG. 7 shows a tilting pad having a pressure block in an enlarged illustration.

Each tilting pad 2 has, as can be seen particularly well from FIG. 7, a radial inner bearing surface 2.1 and a radial outer bearing surface 2.2. The radial outer bearing surface 2.2 is supported by a support surface 3.1 on the housing 1. The radial outer bearing surface 2.2 and the support surface 3.1 are arranged opposite to one another. The support surface 3.1 is implemented here by a pressure block 3, so that each tilting pad 2 is supported by a pressure block 3, preferably directly.

The pressure block 3 is incorporated in the housing 1 in the present case. However, it could be fastened to the housing 1 in another manner or embodied integrally with the housing 1.

Figure 1:
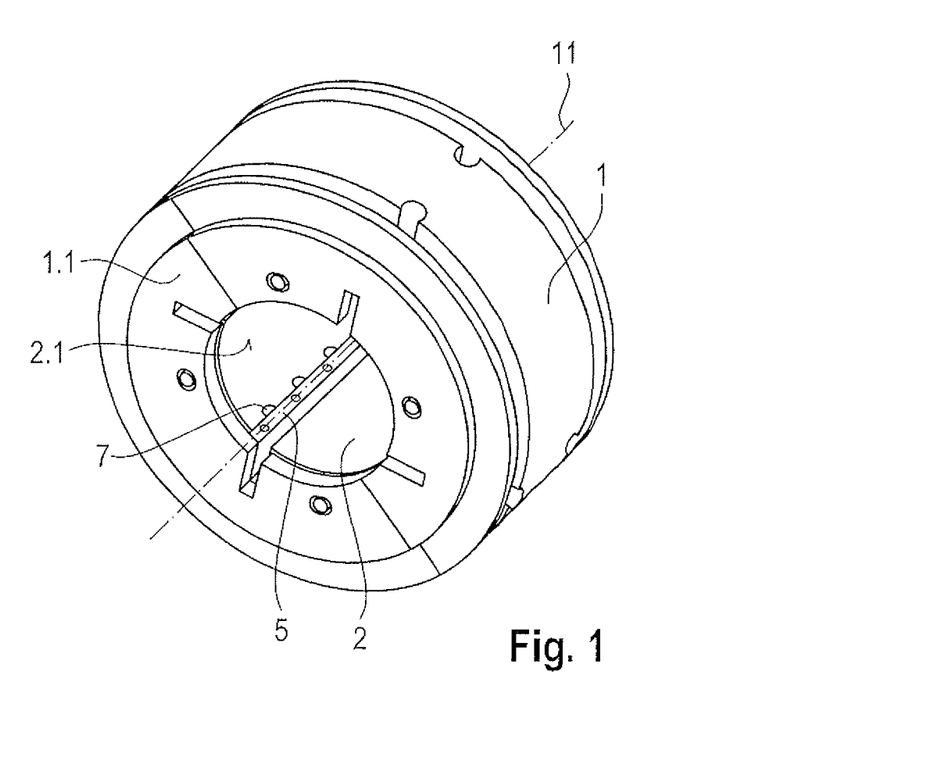
FIG. 1 shows an isometric illustration of a radial tilting pad bearing.
Figure 2:
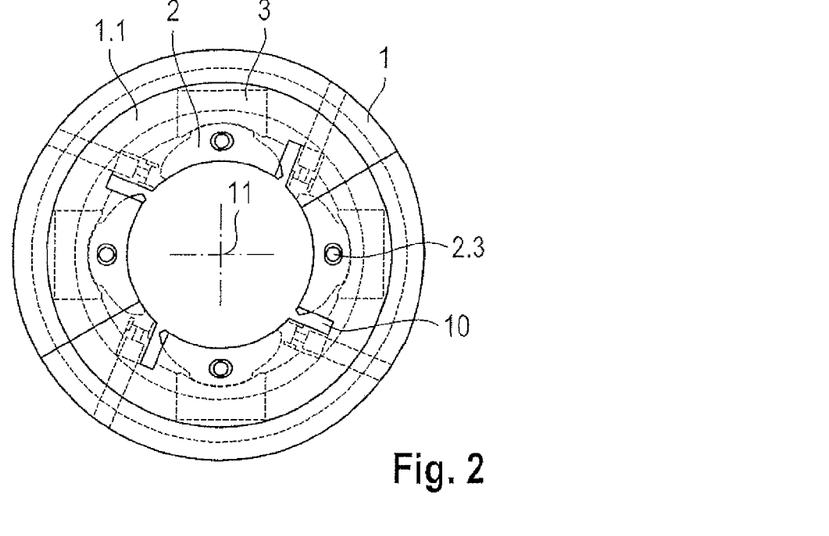
FIG. 2 shows the bearing according to FIG. 1 in a top view of an end side.
Figure 3:
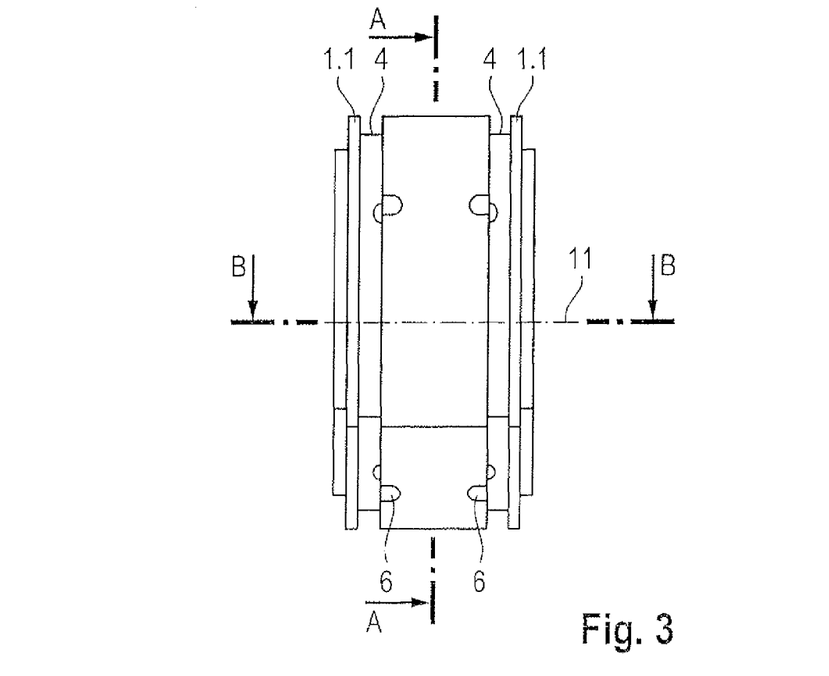
FIG. 3 shows the bearing according to FIG. 1 in a side view.
Figure 4:
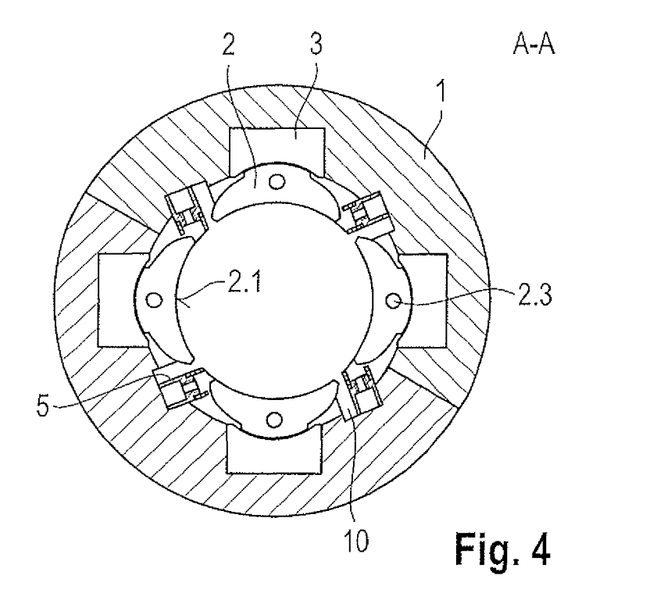
FIG. 4 is an axial section A-A through the bearing according to FIG. 1.
Figure 5:
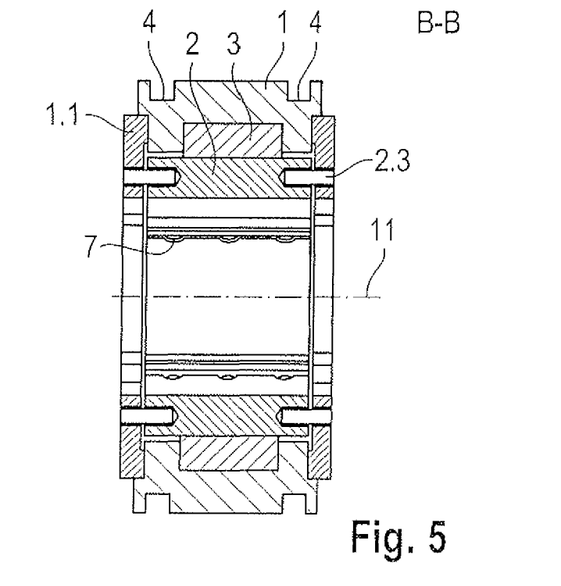
FIG. 5 is a radial section B-B through the bearing according to FIG. 1.

Inter alia, side covers 1.1 of the housing 1 may be recognized in FIGS. 1 to 3. The side covers 1.1 support pad holding pins 2.3, which are incorporated into the tilting pads 2. The pad holding pins 2.3 ensure in non-operation, during the installation and during the transport of the radial bearing, that the tilting pads 2 do not fall out of the bearing, but rather can move in the framework of the radial and tangential play incorporated in the side covers 1.1. The pad holding pins 2.3 are therefore connectable in a formfitting manner to the side covers 1.1, essentially in the radial and tangential directions to the bearing axis 11a, in non-operation of the radial bearing. The pad holding pins 2.3 do not impair the tilting pads 2 during the spatial compensation movements thereof in operation. The pad holding pins 2.3 are not necessary for the operation of the bearing.

Similarly, it is also conceivable that the pad holding pins 2.3 are fixedly connected to the side covers 1.1 and have play in relation to associated boreholes in the tilting pads 2.

The radial inner bearing surface 2.1 of the tilting pads 2 is used for mounting a shaft (not shown here). The latter is enclosed by the housing 1. The radial inner bearing surface 2.1 has a radius which is larger than the associated radius of the shaft at the bearing point. A radial profile would also be conceivable, however. The shaft is mounted in relation to the housing 1 by means of the tilting pads 2 in the radial direction.

Figure 8:
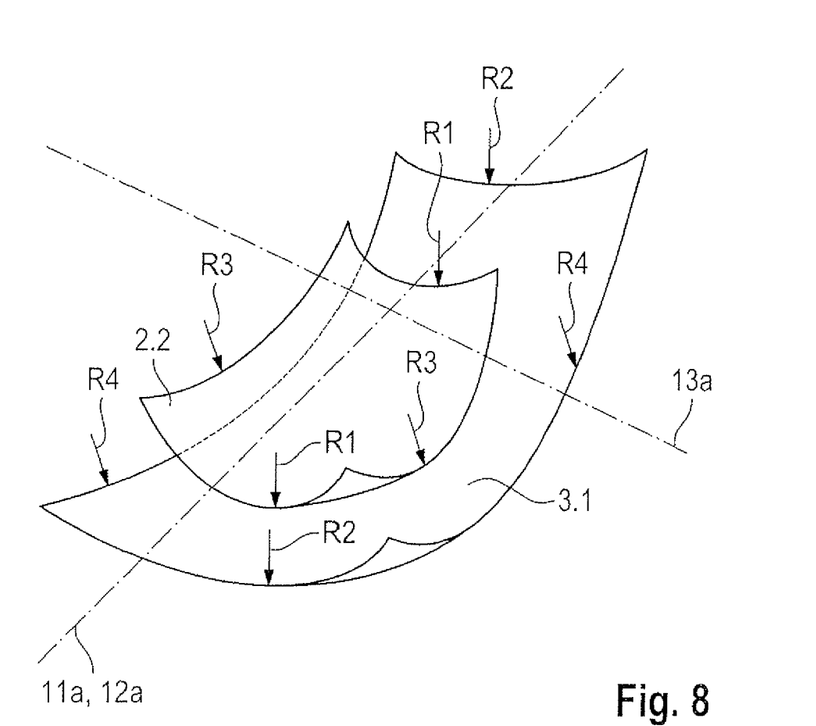
FIG. 8 shows a spatial illustration of the curvatures of the radial outer bearing surface and the support surface.

In order that the radial bearing can absorb and compensate for the spatial movements of the shaft in operation, each tilting pad 2 is arranged so it is movable in relation to the housing 1. FIG. 8 shows in this case only the two surfaces 2.2, 3.1, and specifically in a starting position in which the axis of rotation 12a of the shaft is coincident with the bearing axis 11a. However, this does not necessarily have to be the case. Both axes 11a, 12a could also extend in parallel to one another. Axis 13a extends perpendicularly to the bearing axis 11a.

Figure 9:
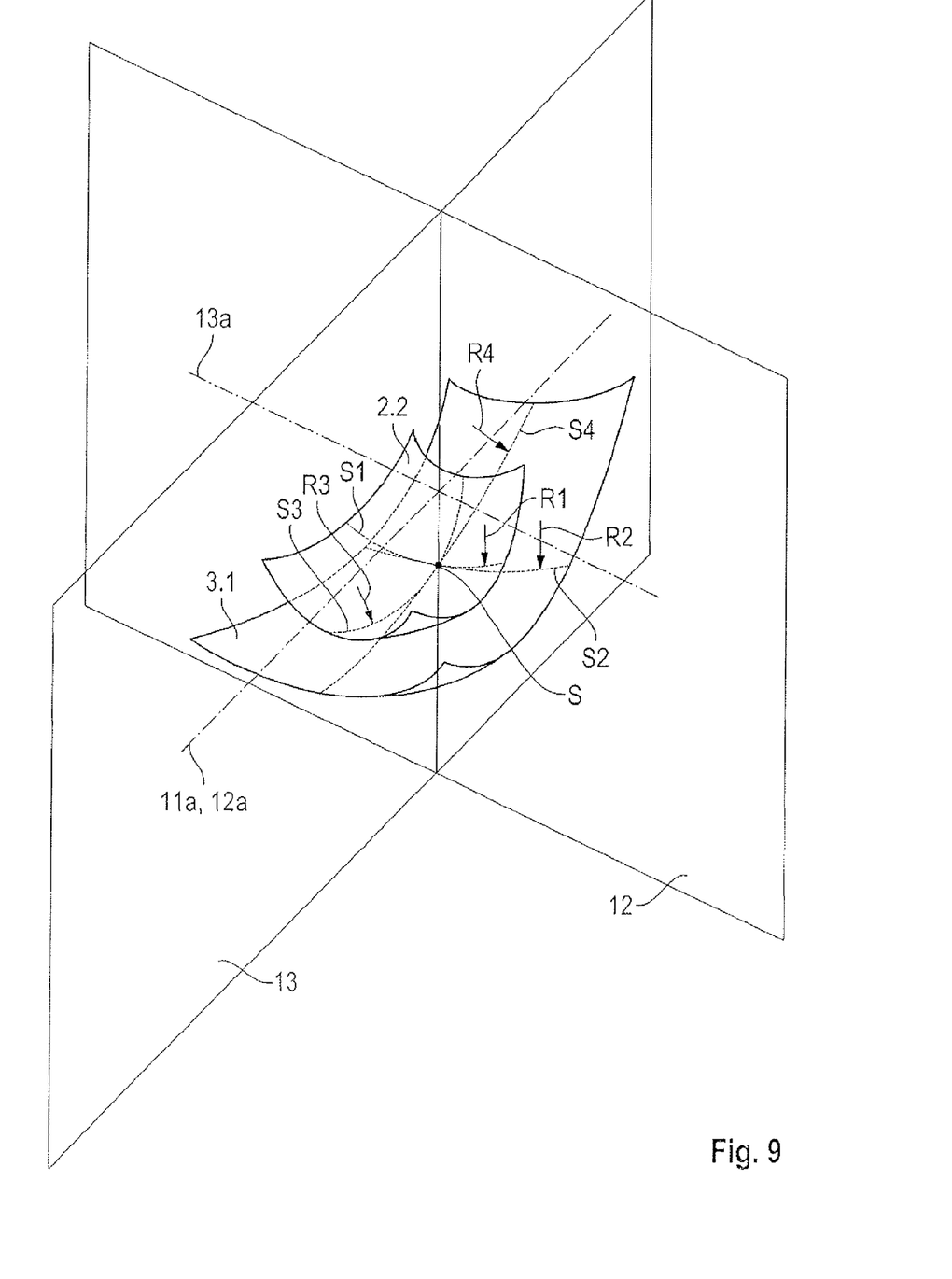
FIG. 9 symbolically shows a spatial illustration of the radius of curvature profile of the radial outer bearing surface and the support surface.

The illustration of FIGS. 8 and 9 is not to scale, so that in particular the difference according to the invention of the radii of curvature of the two surfaces 2.2, 3.1 is only indicated.

As shown in FIG. 9, a first of the surfaces 2.2, 3.1, here the radial outer bearing surface 2.2, forms a first section curve S1 with a first section plane 12 perpendicular to the bearing axis 11a. The section curve is convexly curved and has a first main radius of curvature R1. The second surface, the support surface 3.1 here, forms a second section curve S2 with the section plane 12 perpendicular to the bearing axis 11a, which is accordingly concavely curved and has a second main radius of curvature R2. Vice versa, the section curve S2 of the support surface 3.1 could accordingly be convexly curved and the section curve S1 of the radial outer bearing surface 2.2 could accordingly be concavely curved (not shown).

At least one of the surfaces 2.2, 3.1 also has a secondary curvature in addition to the main curvature. The radial outer bearing surface 2.2, as shown in FIG. 9, thus forms a third section curve S3 with a second section plane 13 perpendicular to the bearing axis 11a. Section curve S3 is convexly curved and has a first secondary radius of curvature R3. Correspondingly, the support surface 3.1 forms a fourth section curve S4 with the second section plane 13, which is concavely curved and has a second secondary radius of curvature R4. Alternatively, the support surface 3.1 can also be free of a secondary curvature (not shown) and therefore can have a second secondary radius of curvature R4, which goes to infinity.

Therefore, the surfaces 2.2, 3.1 are intersected by two section planes 12 and 13 extending perpendicularly to one another, wherein the section plane 12 is perpendicular to the bearing axis 11a and the section plane 13 is in turn parallel to the bearing axis 11a and in the present case extends through the bearing axis 11a. The section curves of the respective surface result in an intersection point in intersection with one another. If the two section points of the opposing surfaces 2.2, 3.1 contact one another, they are thus referred to hereafter as the contact point S.

The two axes 11a and 12a extending perpendicular to one another, as shown in FIGS. 8 and 9, could also be understood as tilting axes of the tilting pad 2, as described at the beginning.

The section plane 13 extends through the bearing axis 11a and the contact point S. The section plane 12 extends perpendicularly to the section plane 13 through the contact point S and the axis 13a.

The tilting pad 2 can compensate for two movements of the shaft, a main movement and a secondary movement, independently of one another. The main movement is described by the shaft in the case of parallelism of the axis of rotation 12a to the bearing axis 11a in the radial direction during the rolling of the first main radius of curvature R1 of the radial outer bearing surface 2.2 on the second main radius of curvature R2 of the support surface 3.1.

The secondary movement is described by the shaft during rolling of the first secondary radius of curvature R3 of the radial outer bearing surface 2.2 on the second secondary radius of curvature R4 of the support surface 3.1 by tilting of the shaft axis 12a in relation to the bearing axis 11a, wherein the two axes remain in the section plane 13. The tilting axis is the axis 13a in this case.

In that the two movements can be superimposed independently of one another, each tilting pad 2 can compensate for any shaft movement in predefined limits.

In the section plane 12, in which the rolling radii of the main movement are imaged, the section curve S1 of the radial outer bearing surface 2.2 always describes, for example, a convex profile and the section curve S2 of the support surface 3.1 always describes a concave profile, for example. In this case, the absolute value of the first main radius of curvature R1 is always less than the absolute value of the second main radius of curvature R2.

In FIG. 9, the section curves S3 and S4 are shown in the section plane 13, in which the rolling radii of the secondary movement are imaged, for the radial outer bearing surface 2.2 as an example with convex profile and for the support surface 3.1 as an example with concave profile. In this case, the absolute value of the third secondary radius of curvature R3 is always less than the absolute value of the fourth secondary radius of curvature R4.

Independently of the embodiments shown in the figures, various combinations of the two surfaces 2.2, 3.1 with respect to the embodiment of the secondary curvature are conceivable.

For this secondary movement, the following line contours of the radial outer bearing surface 2.2 and support surface 3.1 are also conceivable in the section plane 13:

| section curves in the section plane 13 | | |
|---|---|---|
| bearing surface 2.2 (R3) | support surface 3.1 (R4) | radii ratio |
| case 1 (FIGS. 8 and 9) convex | concave | \|R3\| < \|R4\| *) |
| case 2 convex | level | |
| case 3 concave | convex | \|R4\| < \|R3\| *) |
| case 4 level | convex | |

*) \|R\| corresponds to the absolute value of R

The curvature profile of the section curves both in the first section plane 12 (main movement), referred to here as the main radius of curvature, and also in the second sectional plane 13 (secondary movement), referred to here as the secondary radius of curvature, can vary and do not have to be constant. As shown in FIG. 9, for example, the absolute value of the first secondary radius of curvature R3 of the bearing surface 2.2, which is convexly curved here, can decrease with increasing distance from the intersection point/contact point S. Alternatively or additionally, the absolute value of the secondary radius of curvature R4 of the support surface 3.1, which is shown as concave here, can increase with increasing distance from the intersection point/contact point S.

This is also true for the main radius of curvature:

The absolute value of the first main radius of curvature R1 of the bearing surface 2.2, which is convexly curved here, can decrease with increasing distance from the intersection point/contact point S (see FIG. 9), for example. Alternatively or additionally, the absolute value of the second main radius of curvature R2 of the support surface 3.1, which is shown as concave here, can increase with increasing distance from the intersection point/contact point S.

Due to the variations described here of the radii of curvature along the line contours of the section curves S1-S4 in the section planes 12 and 13, a desired, high radial stiffness of the bearing is implemented with simultaneous mobility of the tilting pad 2 by way of an almost spot contact.

In operation of the tilting pad bearing, because of the resulting bearing force equilibrium, the tilting pad 2 is automatically positioned in the circumferential direction in relation to the bearing axis 11a and simultaneously jamming of the shaft in the radial bearing is avoided.

The movement freedom of the tilting pads 2 in the axial direction is limited by the side covers 1.1 (FIGS. 1-3), which can also be embodied as divided. To keep the friction low between the tilting pads 2 and the side covers 1.1 in the scope of the movement freedom of the tilting pads 2, thin plates can be installed on the pad holding pins 2.3 between side cover and tilting pad 2.

To further increase the radial stiffness of the radial bearing, the material of the pressure block 3, independently of the embodiments heretofore shown in the figures, is to have a modulus of elasticity which is greater than that of steel. Values of greater than 200 GPa are sought, for example, 250 GPa or more. For example, a technical ceramic comes into consideration as the material. The production of the radial bearing using components based on ceramic materials is made easier by the use of pressure blocks 3. The pressure blocks 3 and/or the tilting pads 2 come into consideration completely or partially for the embodiment in technical ceramic. Technical ceramic has the advantage of very good heat conductivity. This results in rapid dissipation of the energy dissipated in the lubricant film, and therefore a significant reduction of the maximum bearing temperature. A further advantage of technical ceramic in relation to the pad materials heretofore used is the significantly lower coefficient of thermal expansion. The hazard of an impermissible reduction of the bearing play as a result of transient thermal deformations and the high bearing temperatures thus resulting (temperature overshoots), which can result in the shutdown of the facility, in particular during startup of the turbo-transmission or in transient operation, is therefore reduced.

The lubricant and/or coolant used for the radial bearing according to the invention is generally oil. However, another lubricant and/or coolant, for example, water, can also be used. For example, oil is used as the lubricant and/or coolant in the description.

In particular FIGS. 2, 4, 5, and 6 illustrate the oil supply system according to the invention.

For the oil supply of each gap formed by a respective tilting pad 2 and the shaft (not shown), the housing has at least one, in this case two ring grooves 4. See FIG. 5. The latter preferably extend essentially in the circumferential direction of the housing 1 and are located essentially outside the center of the radial bearing when viewed along the bearing axis 11a. The ring grooves 4 can also be arranged symmetrically to the bearing center on the external diameter of the housing 1 with maximum mutual distance, as shown. Furthermore, oil supply strips 5 are provided. See FIGS. 1, 4, and 6. The oil supply strips 5 have a conductive connection to the ring grooves 4 via oil ducts 6.

Figure 6:
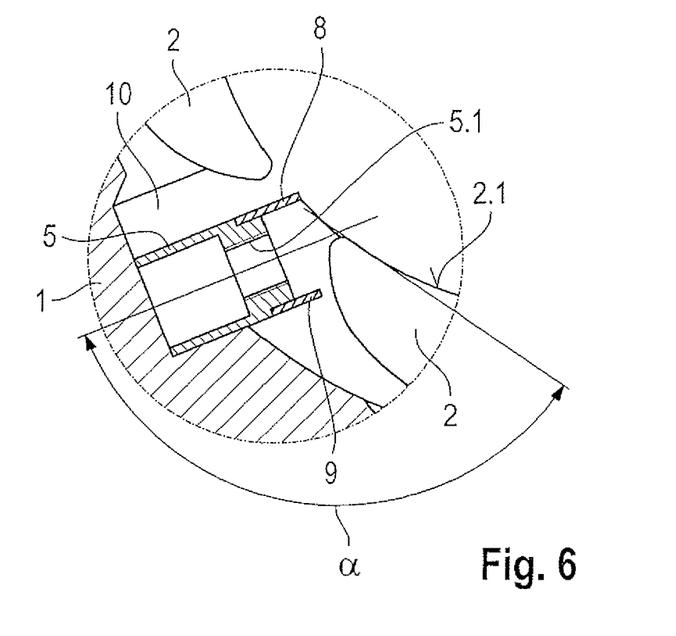
FIG. 6 shows a detail of an oil supply strip in an enlarged scale.

The oil supply strips 5 and also the oil ducts 6 are inclined in relation to a radial jet—see the angle of inclination α in FIG. 6. It could also be said that the longitudinal axis of the oil ducts 6 extends in an axially-perpendicular section through the bearing axis 11a like a secant on the circle delimited by the lateral surface of the shaft. In this case, the angle α is the angle between the oil supply direction and the tangential plane on the tilting pad contact surface to the shaft through the intake edge. Intake edge is understood to mean the edge of the tilting pad 2, which is first passed over by the shaft in the rotational direction of the shaft. The edge of the same tilting pad 2 which is arranged after the intake edge in the rotational direction of the shaft is referred to as the outlet edge. The angle α is greater than 90°. Particularly effective injection of the oil into the gap is guaranteed by the mentioned inclination. Each oil supply strip 5 has threaded boreholes 5.1 for screwing in metering screws (not shown here). The oil quantity may be adapted to the operating parameters by the use of such a metering screw having a predetermined discharge surface area. Recesses 7 at the intake edge of each tilting pad 2 increase the effectiveness of the oil supply. In this case, each metering screw is assigned a recess 7. Recess 7 and metering screw overlap in the direction of the longitudinal axis of the oil ducts 6.

To reduce spilling over of hot entrained oil, which flows over the outlet edge out of the lubricating gap between shaft and pad in the direction toward the intake edge of a downstream tilting pad 2 in the rotational direction of the shaft, the oil supply strip 5 is provided with an elastic entrained oil barrier 8. To reduce a passage of the hot oil from the pad back into the oil intake region, a second elastic oil barrier 9 is provided.

Because the entrained oil barrier 8 is arranged between two tilting pads 2, i.e., between an outlet edge of one and an inlet edge of the other tilting pad and protrudes with its free end from the radial outside into the region of the gap, it can significantly reduce mixing of hot entrained oil with the cold fresh oil supplied via the oil supply strip 5 and therefore can separate the two oil streams particularly well from one another.

The oil barrier 9 is furthermore used to supply the relatively cold fresh oil into the respective gap, which is implemented between tilting pad and shaft. This oil barrier 9 can also be arranged between the two tilting pads 2 and protrudes with its free end from the radial outside into an intermediate space between housing 1 and tilting pad 2.

Preferably, the free end of the one and/or the further oil barriers 8, 9 can be arranged essentially radially outside a radial inner surface 2.1 of the tilting pad. In this case, the free end of one oil barrier 8 can be arranged spaced apart in the circumferential direction from the free end of the further oil barrier 9 and can be arranged before the free end of the further oil barrier 9 when viewed in the rotational direction of the shaft, as shown in FIG. 6. The oil supply strip 5 and the one and/or the further oil barriers 8, 9 can extend along the entire length of the tilting pad 2 in the direction of the bearing axis 11a. However, this is not absolutely necessary. One or both of the oil barriers 8, 9 can be fastened on the oil supply strip 5, in particular on its radial inner end, or can be embodied integrally therewith. The oil supply strip 5 can also be implemented integrally with the housing 1. A plurality of metering screws, which are spaced apart from one another, and which have a flow conducting connection to the oil duct 6, can be provided along the oil supply strip 5.

The relatively hot entrained oil deflected at the oil barrier 8 can be discharged from the bearing via oil discharge grooves 10, which are introduced into the housing 1 and/or into the side cover 1.1. In each case one such oil discharge groove 10 can be provided distributed on the circumference around the bearing axis 11a per tilting pad 2 or per oil supply strip 5. Of course, a number deviating therefrom is also conceivable. The oil supply strip 5 and/or the one oil barrier 8 can delimit the oil discharge groove 10 in this case. The latter is/are arranged downstream from the oil discharge groove 10 viewed in the rotational direction of the shaft. It could also be said that the oil discharge groove 10 is oriented toward the discharge edge of the tilting pad 2, in order to capture the relatively hot entrained oil 5 discharged from the gap via this edge.

The advantages of the invention may be summarized as follows: because of the spatial compensation movement of the tilting pads, tilting of the shaft in the bearing is avoided and the carrying capacity is increased and the maximum occurring temperature is reduced. The special shape of the crowning on the rear side of the tilting pads in the axial direction and also the convex pad geometry in conjunction with the material technical ceramic, from which the pressure blocks and/or the tilting pads are manufactured, results in very high radial stiffness. This is the foundation for improved rotor-dynamic properties of the mounting. Since the technical ceramic to be used has very good thermal conductivity, the foundation for a reduction of the maximum bearing temperature is therefore also provided. A further advantage of the technical ceramic in relation to the previous pad materials is the significantly lower coefficient of thermal expansion. Therefore, the danger of bearing play reductions due to temperature overshoots in transient operation may be significantly reduced.

The arrangement of the oil supply strips 5 with the oil barriers 8, 9 for guiding the lubricant and coolant in combination with the arrangement of the ring grooves 4 and oil discharge grooves 10 ensures a further reduction of the mean tilting pad temperature in operation of the radial bearing. The arrangement of the ring grooves 4 on the housing circumference outside the axial bearing center ensures direct force transmission and therefore an increase of the tilting pad support capability.

List of Reference Numerals 1 housing
1.1 side cover
2 tilting pad
2.1 radial inner bearing surface
2.2 radial outer bearing surface
2.3 pad holding pin
3 pressure block
3.1 support surface
3.2 center line
4 ring groove
5 oil supply strip
5.1 threaded borehole
6 oil duct
7 recess
8 barrier
9 barrier
10 oil discharge groove
11a bearing axis
12a axis of rotation of the shaft
13a axis perpendicular to the bearing axis 11a
12, 13 section planes
R1 radius of curvature of the radial outer bearing surface 2.2 transverse to the bearing axis
R2 radius of curvature of the support surface 3.1 transverse to the bearing axis
R3 radius of curvature of the radial outer bearing surface 2.2 perpendicular to the bearing axis
R4 radius of curvature of the support surface 3.1 perpendicular to the bearing axis
S intersection point
S1, S2 section curves in plane 12
S3, S4 section curves in plane 13

The invention claimed is:

1. A radial bearing comprising:
a housing;
a housing borehole extending along a bearing axis;
multiple tilting pads arranged about the bearing axis to mount a shaft, wherein each of the multiple tilting pads has a radially outer bearing surface supported by a support surface of the housing;
the radially outer bearing surface of each of the multiple tilting pads and the support surface are arranged opposite to one another;
each of the multiple tilting pads is arranged to be movable in relation to the housing;
the radially outer bearing surface of each of the multiple tilting pads forms a first section curve with a first section plane perpendicular to the bearing axis, wherein the first section curve is convexly curved and has a first main curvature radius;
the support surface forms a second section curve with the first section plane perpendicular to the bearing axis; wherein the second section curve is correspondingly concavely curved and has a second main curvature radius, wherein an absolute value of the first main curvature radius of the radially outer bearing surface is less than an absolute value of the second main curvature radius of the support surface;
the radially outer bearing surface forms a third section curve with a second section plane parallel to the bearing axis;
the third section curve is convexly curved and has a first secondary curvature radius;
the support surface forms a fourth section curve with the second section plane parallel to the bearing axis; the fourth section curve is concavely curved and has a second secondary curvature radius or is not curved and has no curvature;

the first secondary curvature radius and the second secondary curvature radius differ from one another;

the first main curvature radius and the second main curvature radius differ from one another;

the first and the second main curvature radii and/or the first and the second secondary curvature radii of the support surface decrease with increasing distance from an intersection point, wherein the intersection point is formed by the first and the second section planes and the support surface.

2. The radial bearing according to claim 1, wherein the second main curvature radius of the support surface at the intersection point in a section plane perpendicular to the bearing axis is less than a distance between the bearing axis and the intersection point.

3. The radial bearing according to claim 1, wherein each of the multiple tilting pads is positioned in a the circumferential direction such that a resulting hydrodynamic force on a radial inner bearing surface of each of the multiple tilting pads is in equilibrium with a reaction force on the radial outer bearing surface, which only arises at a spot-shaped contact between the radial outer bearing surface and the support surface.

4. The radial bearing according to claim 1, wherein the support surface is arranged on a pressure block, and wherein the pressure block is fastened on the housing, is embedded in the housing, or is embodied integrally with the housing.

5. The radial bearing according to claim 1, wherein the multiple tilting pads and/or pressure blocks have a material, wherein a modulus of elasticity of the multiple tilting pads and/or the pressure blocks is greater than 200 GPa.

6. The radial bearing according to claim 1, wherein:

a lubricant and coolant is provided to the radial bearing using a ring groove, wherein the ring groove extends in a circumferential direction in the housing and is not located in the bearing center in an axial direction; and the lubricant and coolant is provided to each of the multiple tilting pads using a radially extending borehole in the housing, wherein the at least one radially extending borehole has access to the ring groove.

7. The radial bearing according to claim 1, wherein the radial bearing comprises a first oil barrier for tapping hot entrained oil from a gap formed by a respective tilting pad of the multiple tilting pads and the shaft, wherein the first oil barrier is arranged between two tilting pads of the multiple tilting pads and protrudes with a free end from a radial outside into a region of the gap.

8. The radial bearing according to claim 7, wherein the radial bearing comprises a second oil barrier for supplying cold fresh oil to the gap formed by the respective tilting pad of the multiple tilting pads and the shaft, wherein the second oil barrier is arranged between the two tilting pads of the multiple tilting pads and protrudes with a free end from the radial outside into an intermediate space between the housing and the respective tilting pad, and wherein the cold fresh oil has a lower temperature than the hot entrained oil.

9. The radial bearing according to claim 8, wherein at least one of the first and the second oil barriers is inclined in relation to a radial of the bearing axis.

10. The radial bearing according to claim 8, wherein a radial inner end of at least one of the first and the second oil barriers is located on or radially outside a radial inner bearing surface, wherein the first and the second oil barriers are arranged on an oil supply strip or are embodied integrally therewith or are embodied with the housing.

11. The radial bearing according to claim 1, wherein an oil supply strip for supplying coolant or lubricant to a gap formed by a respective tilting pad of the multiple tilting pads and the shaft is arranged between two tilting pads of the multiple tilting pads; and the oil supply strip discharges into a region of the gap and, wherein a discharge surface area thereof is oriented onto an edge of the respective tilting pad, wherein the respective tilting pad is first passed over by the shaft when viewed in the rotational direction of the shaft.

12. The radial bearing according to claim 1, wherein at least one holding means is provided, such that a respective tilting pad of the multiple tilting pads does not fall out of the housing during transportation or installation.

13. The radial bearing according to claim 12, wherein at least one of the multiple tilting pads has recesses in a region of an intake edge for supplying oil exiting from an oil supply strip into a gap.

14. The radial bearing according to claim 13, wherein the oil supply strip has discharge openings, and wherein the discharge openings overlap with the recesses in a direction of a longitudinal axis of the discharge openings.

15. The radial bearing according to claim 1, wherein a side cover is attached to an axial surface of the housing.

* * * * *